United States Patent [19]
Blitch

[11] 3,834,360
[45] Sept. 10, 1974

[54] ENGINE INTAKE AIR MOISTURIZER
[76] Inventor: James A. Blitch, P.O. Box 206, E. Palatka, Fla. 33026
[22] Filed: Apr. 26, 1973
[21] Appl. No.: 354,488

[52] U.S. Cl. .................................. 123/25 A, 261/99
[51] Int. Cl. .......................................... F02d 19/00
[58] Field of Search ..... 123/25 A, 25 R, 25 J, 25 L, 123/25 G; 261/99, 18 A, 104, 107

[56] References Cited
UNITED STATES PATENTS
| | | | |
|---|---|---|---|
| 2,580,013 | 12/1951 | Gazda | 261/99 |
| 3,139,462 | 6/1964 | Scott | 261/107 |
| 3,722,837 | 3/1973 | Dapprich | 261/107 |
| 3,734,474 | 5/1973 | Olati | 261/99 |

FOREIGN PATENTS OR APPLICATIONS
10,346   11/1927   Australia............................ 261/107

Primary Examiner—Charles J. Myhre
Assistant Examiner—R. H. Lazarus
Attorney, Agent, or Firm—Oltman and Flynn

[57] ABSTRACT

A porous clay ring having radial air passages and a water chamber for supplying water to the radial passages through the pores of the ring to be picked up by the air flowing through these passages to an engine carburetor.

8 Claims, 4 Drawing Figures

PATENTED SEP 10 1974 3,834,360

3,834,360

ENGINE INTAKE AIR MOISTURIZER

BACKGROUND OF THE INVENTION

Various proposals have been made heretofore for adding water to the air that is drawn into the carburetor of an internal combustion engine, particularly on automotive vehicles. Moisture added to the air is believed to reduce significantly the engine combustion temperature, and to avoid an excess of unburned hydrocarbons a leaner gas-air mixture may be used in order to bring the engine combustion temperature up to what is considered a desirable level. The net results of moisturizing the intake air and using a leaner fuel mixture are believed to be a slower rate of combustion, a reduction of carbon monoxide emissions, a reduction of carbon deposits in the engine, a reduction of engine vibration, and significantly improved gas mileage.

The prior moisturizing devices have not been entirely satisfactory from the standpoints of operating effectiveness, cost, and simplicity of manufacture and assembly.

SUMMARY OF THE INVENTION

The present invention is directed to a novel and improved air moisturizer for internal combustion engines that combines structural simplicity and ease of manufacture with practical effectiveness and uniformity of operation.

In the preferred embodiment, the present air moisturizer is a fired ring of porous ceramic clay having radial air passages which are water-soaked by the interstitial migration of water through the clay from a water chamber in the ring. These air passages are of relatively small cross-section to enhance the effectiveness of water transfer from the clay ring to the separate streams of air flowing into the carburetor.

Accordingly, it is a principal object of this invention to provide a novel and improved engine intake air moisturizer.

Another object of this invention is to provide such an air moisturizer which is relatively simple in construction and is easily installed ahead of the air intake on an engine carburetor, yet is highly effective in adding moisture to the intake air.

Further objects and advantages of this invention will be apparent from the following detailed description of a presently preferred embodiment thereof, which is shown in the accompanying drawings, in which.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

Figure 4:
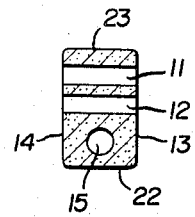
FIG. 4 is a vertical cross-section taken along the line 4 — 4 in FIG. 2.
Figure 3:
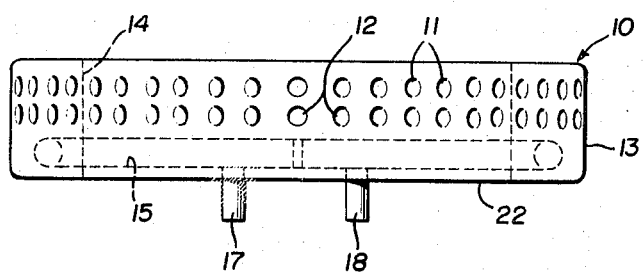
FIG. 3 is an elevational view of the moisturizer standing alone.

Referring to the drawing, in its preferred embodiment the present invention is in the form of a ring 10 of fired porous clay, or other suitable porous hygroscopic material, having the capability of passing water relatively freely through its pores or interstices by capillary action. The ring is formed with vertically spaced, upper and lower, annular rows of radial passages 11 and 12, each extending completely through the ring from its cylindrical outer peripheral surface 13 to its cylindrical inner peripheral surface 14, as best seen in FIG. 4.

Figure 2:
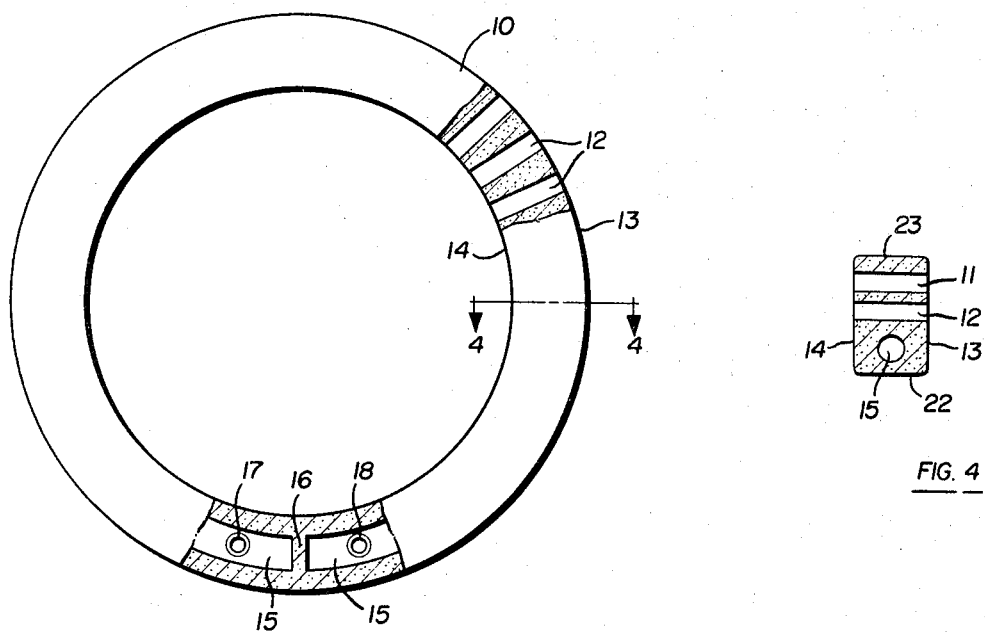
FIG. 2 is a top plan view of this moisturizer, with certain parts broken away for clarity.

A water chamber 15 extends circumferentially around the ring below the level of the lower row of passages 12 for almost, but not quite, the complete circumferential extent of the ring. The opposite ends of this chamber are separated by a transverse wall portion 16 of the ring, as best seen in FIG. 2.

A pair of vertical nipples 17 and 18 open into the opposite ends of the water chamber 15. The outer ends of these nipples are connected through respective flexible hoses 19 and 20 (FIG. 1) to a suitable water source 21. This water source may feed water by gravity flow to the chamber 15, or it may convey water under pressure in a continuous flow. Preferably, the water source keeps the water chamber 15 substantially filled.

In the particular embodiment shown, the nipples 17, 18 are at the bottom of the porous ring 10. However, it is to be understood that the ring may be inverted from the position shown and have the nipples 17, 18 at the top and the water chamber 15 above the two rows of radial passages 12 and 11.

The annular bottom face 22 of the ring is glazed by firing in a kiln, so as to hold the water in the ring. The nipples 17 and 18 are glazed also. The outer peripheral surface 13, the inner peripheral surface 14, and the top surface 23 of the ring may be glazed, also, to enhance its water-retention properties.

Preferably, the ring is formed by molding the clay to provide the ring shape and the chamber 15, then firing it in a kiln, and then drilling the radial passages 11 and 12. Alternatively, the passages 11 and 12 may be molded in. The clay preferably is of the type commonly used in making ceramic pottery.

The water introduced into the water chamber 15 passes by capillary action through the porous body of the ring to the radial passages 11 and 12 and is taken up by the engine intake air flowing radially along these passages.

Figure 1:
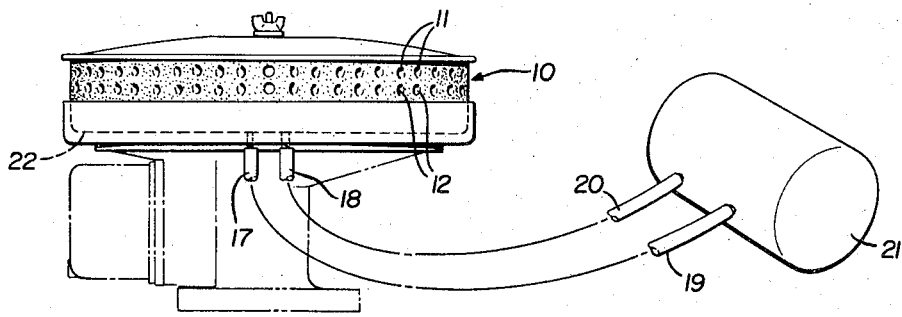
FIG. 1 is a schematic elevational view showing the present air moisturizer installed on the carburetor of an automobile.

The ring 10 is shown in FIG. 1 as installed on the outside of a conventional annular air cleaner for the carburetor of an internal combustion engine on an automotive vehicle. The air drawn into the carburetor flows radially inward through the water-soaked passages 11 and 12 and picks up moisture there which improves the engine combustion, as already described.

A particular advantage of the present invention is that substantially all of the air entering the carburetor must flow through the moisture-laden passages 11 and 12. These passages are relatively narrow, and no significant percentage of the air entering the carburetor can avoid exposure to the water at the passages 11 and 12. Consequently, they provide a very effective, substantially uniform transfer of moisture into the air that is drawn into the carburetor.

I claim:

1. A moisturizer for an engine carburetor comprising a porous ring having a plurality of lateral passages throughout substantially its entire circumferential extent for passing air from the outside to the inside of the ring, said ring having water chamber means therein for receiving water, said water chamber means being spaced from said passages and communicating with the latter only through the porous material of the ring to add water to the air flowing through said passages.

2. A moisturizer according to claim 1, wherein said passages extend substantially radially of the ring.

3. A moisturizer according to claim 1, wherein said water chamber means is a chamber extending around the ring for most of the latter's circumferential extent and spaced vertically from said passages.

4. A moisturizer according to claim 3, and further comprising nipples which open into said chamber near its opposite ends and project away from the ring.

5. A moisturizer according to claim 1, wherein said ring is of ceramic clay.

6. A moisturizer according to claim 5, wherein said ring has a glazed bottom for retaining water in the ring.

7. A moisturizer according to claim 1, wherein said ring is of ceramic clay, said passages extend substantially radially of the ring, and said water chamber means is a chamber extending around the ring for most of the latter's circumferential extent.

8. A moisturizer according to claim 7, wherein said ceramic clay ring is glazed on the bottom to retain water in the ring.

* * * * *